United States Patent Office 3,120,558
Patented Feb. 4, 1964

3,120,558
SYNTHESIS OF NITRILES
James Bryan Zachry and Clyde Lee Aldridge, Baton Rouge, La., assignors to Esso Research and Engineering Company, a corporation of Delaware
No Drawing. Filed Feb. 21, 1961, Ser. No. 90,651
10 Claims. (Cl. 260—465.3)

This invention relates to a process for preparing relatively high molecular weight organic nitriles from relatively low molecular weight organic nitriles by a free radical mechanism.

More particularly this invention relates to the preparation of an organic nitrile by reacting a starting alkanenitrile with an olefin in the presence of a free radical forming initiator to produce an alkanenitrile product having in the molecule a number of carbon atoms equal to at least the sum of the carbon atoms in the starting alkanenitrile and the olefin.

Still more particularly, this invention comprises the reaction of a lower molecular weight alkanenitrile in the presence of a free radical source under conditions which will promote the growth of low molecular weight monomers onto the organic nitrile in a telomerization type reaction.

Organic nitriles have been prepared by the reaction of a corresponding monocarboxylic acid with an ammonium ion source to convert the acid into its salt which when distilled with a strong dehydrating agent such as phosphorus pentoxide, may be converted into the nitrile. Similarly, acid amides may be converted by distillation in the presence of a dehydrating agent such as phosphorus pentachloride to the corresponding organic nitrile.

Other newer methods for the production of organic nitriles are known in the art. These methods, however, while economical for the production of low molecular weight nitriles, such as acetonitriles, are costly for the preparation of the high molecular weight nitriles and the industry has long sought a simple and economical process for the preparation of the relatively higher molecular weight alkanenitriles.

By the process of the present invention acetonitrile or other relatively inexpensive lower molecular weight organic nitriles may be converted into their high molecular weight homologs such as hexanenitrile, octanenitrile, decanenitrile, and even higher molecular weight homologs. In the preferred embodiment of this invention, ethylene is reacted with acetonitrile in the presence of a free radical source at a temperature of from ambient to 500° C., preferably 150–350° C., and ethylene partial pressures of 100–5000 p.s.i.g., for a period of 5 minutes– 5 hours to effect a reaction product comprising a mixture of alkanenitriles higher in molecular weight than acetonitrile and in this circumstance bearing an even number of carbon atoms. Unreacted acetonitrile may be removed by standard distillation techniques and the remaining mixture of high molecular weight organic nitriles may be utilized as such or separated into the individual nitrile compounds.

To indicate the probable mechanism involved, reference is had to the following series of reactions which it is believed occur during the process under the conditions aforesaid.

(I)  R·+CH$_3$C≡N→ ·CH$_2$C≡N+R—H
(II) ·CH$_2$—C≡N+$n$CH$_2$=CH$_2$
     → ·(CH$_2$CH$_2$)$_n$CH$_2$C≡N
(III) ·(CH$_2$CH$_2$)$_n$CH$_2$C≡N+CH$_3$C≡N
     → H(CH$_2$CH$_2$)$_n$CH$_2$C≡N+·CH$_2$C≡N

Reaction I results from the effect of the initiator and R· represents the free radicals formed. Except for this free radical formation, Reaction I plays no further part in the chain mechanism which follows. The olefins employed may be ethylene as shown in Reaction II or any other olefin desired up to about C$_{15}$ such as pentapropylene. The lower molecular weight olefins such as ethylene, propylene, n- and iso-butylene will react more rapidly than higher molecular weight olefins to produce the desired telomerization reaction wherein a plurality of olefin monomeric units will be added to the nitrile. Higher molecular weight olefins such as octene, nonene, decene and higher react more slowly and require more severe reaction conditions. It is possible to add a single monomeric unit onto the nitrile in lieu of a plurality of such units. For example, one mole of decene or in general a C$_6$–C$_{15}$ olefin may be reacted with one mole of acetonitrile under the conditions recited to produce dodecanenitrile or the corresponding C$_8$–C$_{17}$ alkanenitrile. Mixtures of various olefins may be employed if desired to obtain a smear of different molecular weight nitriles. When an even numbered olefin such as ethylene is reacted with an even numbered nitrile such as acetonitrile the product will contain largely even numbered nitriles. The molecular weight distribution of the product can be predetermined by the proper selection of the starting materials as indicated by the following equation $$n(RC\!=\!CH_2)+R'CH_2C\!\equiv\!N \rightarrow H(RCH\!-\!CH_2)_n CRHC\!\equiv\!N$$
(with H above the arrow)

where R and R' are either hydrogen or a C$_1$–C$_{13}$ alkyl group and preferably hydrogen or C$_1$–C$_3$ alkyls. This invention therefore contemplates upgrading for example a moderately high molecular weight alkanenitrile such as decanenitrile to a higher molecular weight compound such as dodecanenitrile. If a solvent or diluent is desired the nitrile reactant may be used in excess or any essentially unreactive hydrocarbon such as benzene or the normal paraffins may be employed. The olefin feed is preferably maintained under sufficient pressure to aid in driving the reaction and it is desirable to use a stoichiometric excess of olefin relative to the desired final product. The olefin may be maintained at a partial pressure of from 0–5000 p.s.i.g. Preferably, however, this pressure with ethylene or other light olefinic feeds should range between 100–3000 p.s.i.g. These preferential ranges, however, need not be followed since in the case of light olefins the average molecular weight of the product is controlled to a large extent by the partial pressure of the olefinic feed and in the case of heavier olefins by the molar concentration of olefin with respect to nitrile. For the higher molecular weight olefins, e.g., C$_6$–C$_{15}$, a molar ratio of 1–10 to 1 olefin to nitrile may be used, it being understood that when nitrile is used as diluent or solvent these ranges will not necessarily apply.

Temperature, of course, plays an important role in promoting this reaction and is preferably maintained between 50–350° C. In order to provide the free radicals as indicated in the theoretical equations, any of various initiators may be employed. The optimum temperature selected will depend on the molecular weight of the desired product and the activity of the particular initiator selected.

The initiators especially useful in this reaction include organic and inorganic per-oxygen compounds and hydroperoxides, such as cumene hydroperoxide, as well as tetralin hydroperoxide and tertiary butyl hydroperoxide; regular peroxides such as benzoyl peroxide, di-tertiary butyl peroxide, di-2-phenylpropyl-2-peroxide, hydrogen peroxide, sodium persulfate, potassium peracetate, etc. α,α-Azo-bis-isobutyronitrile and similar α,α-azo-bis-alkane-nitriles, especially those having alkyl groups of 3 to 6 carbon atoms, such as those derived from 2-cyano butane, 2-cyano pentane, cyano cyclopentane, etc., are also useful as sources of free radicals. The initiator may most conveniently be supplied in the form of a solution, using either a solvent which is inert in the reaction; e.g., benzene, or preferably using a portion of the nitrile reactant as the solvent.

Additionally, other initiators such as air, radiation, or UV light are acceptable in lieu of the chemical initiators recited. With regard to the chemical initiators noted above, they should be present in an amount of from 0.005 to 5.0 weight percent based on the total liquid feed which will comprise starting nitrile reactant and diluent if used.

It is to be understood, however, that in a continuous process where intermediate organic nitrile compounds are recycled to the main reaction zone that this recycle nitrile product will constitute fresh feed and should be accounted for in determining initiator concentrations. Preferably small concentrations of initiator should be employed; e.g., 0.01–1.0 weight percent since the use of small initiator concentrations seem to promote higher initiator efficiencies in terms of gram product obtained per gram of initiator employed. With radiation or UV light the amount of initiator may be controlled by other standard techniques. The chemical initiator may be added in any convenient manner for example in one batch at the beginning of the reaction, continuously at a steady or fluctuating rate or in 2 or more increments. The use of slow initiator or incremental addition will promote an increase in initiator efficiency again in terms of gram product per gram of initiator. While the reaction or holding time may vary considerably, that is from 5 minutes to 5 hours, best results may be obtained with holding or reaction times in the order of 30 minutes to 2 hours. As noted from the theoretical representation of the reaction mechanism, a free radical nitrile is produced which in turn reacts with the ethylene or other olefinic feed to produce the telomer nitrile product in the form of a free radical which product is capable of transferring by chain mechanism the free radical to the lower molecular weight organic nitrile which is then ready to accept additional olefinic monomers. While the aforesaid description has been directed primarily to a batch or bomb operation such as utilized in the laboratory, the process steps may be translated with ease to the usual commercial type of continuous or semi-continuous process.

To demonstrate more clearly the invention, reference is now had to the following examples:

EXAMPLE I

A 1 l. stainless steel Parr stirred autoclave was evacuated and then charged with 500 ml. of pure acetonitrile. The vessel was heated to 250° C. at which point the pressure in the vessel was the vapor pressure of acetonitrile, 540 p.s.i.g. A solution of 1.0 g. di-tertiary-butyl peroxide in sufficient acetonitrile to make a total volume of 20 ml. was injected into the autoclave in ten 2 ml. increments at 5 minute intervals with ethylene pressure. The ethylene partial pressure was maintained at an average of 460 p.s.i. and the total pressure on the vessel averaged 1000 p.s.i.g. After the last injection of initiator solution, heating at 250° C. with stirring was continued for an additional 15 minutes so that the total reaction time was 1 hour. After cooling and venting the vessel the reaction mixture was discharged. Excess acetonitrile was removed by distillation until the vapor temperature reached 110° C. at which point the pot temperature was 240° C. The product which comprised a mixture of higher alkanenitriles was recovered as a residue from the distillation flask and weighed 6.0 g. The product average molecular weight obtained cryoscopically in benzene was 114. Based on this molecular weight the theoretical nitrogen content for the nitrile mixture was 12.3%; found 12.0%. The first three major components of the nitrile mixture were isolated using a Beckmann Megachrom 100,000 preparative scale gas chromatograph. These components were identified by their infrared spectra and refractive indices as follows:

| Component | $n_D^{25}$ | Percent Total Product |
|---|---|---|
| Butanenitrile | 1.3822 | 10 |
| Hexanenitrile | 1.4045 | 11 |
| Octanenitrile | 1.4175 | 16 |

A series of similar runs was made at various temperatures and ethylene partial pressures with results as tabulated in Table I.

*Table I*

| Run No | 2 | 3 | 4 | 6 | 7 | 13 |
|---|---|---|---|---|---|---|
| Acetonitrile Charge, ml | 500 | 500 | 500 | 500 | 500 | 500 |
| Di-t-butyl Peroxide Added, g | 2 | 2 | 2 | 2 | 4 | 1 |
| Reaction Conditions: | | | | | | |
| Temperature, ° C | 200 | 200 | 200 | 250 | 160 | 250 |
| Ethylene Partial Pressure, p.s.i.g. Au | 280 | 380 | 400 | 430 | 100 | 890 |
| Pressure Adsorbed During Run | 370 | 290 | 390 | 400 | 190 | 390 |
| Nitrile Product: | | | | | | |
| G | 9.5 | 8.2 | 9.3 | 8.4 | 13.7 | 9.7 |
| M.W. | 143 | 157 | 138 | 127 | 147 | 133 |
| Nitrogen Content, Percent— | | | | | | |
| Theoretical | 9.8 | 8.9 | 10.1 | 11.0 | 9.5 | 10.5 |
| Found | 8.5 | 9.3 | 9.0 | 10.8 | 9.8 | 10.4 |

EXAMPLE II

To a one liter stainless steel stirred autoclave was charged 450 ml. of acetonitrile. The temperature was raised to 250° C. at which time the vapor pressure of the nitrile was 500 p.s.i.g. Ethylene was pressured into the autoclave to a partial pressure of 2000 p.s.i., thus giving a total pressure of 2500 p.s.i.g. The autoclave was pressure tested under these conditions for 30 minutes, after which a solution of di-t-butyl peroxide in acetonitrile (1.00 g. per 21.8 ml. of solution) was injected for 1 hour at the rate of 21.8 ml. per hour. Immediately upon the start of initiator addition, reaction started as shown by absorption of pressure. Each time the total pressure dropped to 2250 p.s.i.g. it was raised to 2500 p.s.i.g. again. During the 1 hour reaction time a total of 920 p.s.i. of ethylene partial pressure was absorbed. After the injection of initiator was stopped the absorption of ethylene ceased. The reactor was maintained on conditions for an additional 15 minutes to demonstrate the absence of leaks. The autoclave was cooled and the contents discharged. The effluent was distilled to remove volatile products; e.g., initiator decomposition products, and unreacted acetonitrile. The distillation was carried to a vapor temperature of 97° C. and a stillpot temperature of 252° C. at atmospheric pressure. The higher nitrile product remaining in the distillation flask amounted to 36.0 g. The molecular weight of this product as determined cryoscopically in benzene was 202, which corresponds to an average carbon number of 13.5. The infrared spectrum of this product was characteristic of higher nitriles.

A series of such runs was made at various temperatures and ethylene partial pressures with results as tabulated in Table II.

*Table II*

| Run No | 12 | 13 | 14 | 15 | 16 |
|---|---|---|---|---|---|
| Acetonitrile Charge, ml | 450 | 450 | 340 | 450 | 450 |
| Di-t-butyl Peroxide Added, g | 1.00 | 1.00 | 1.00 | 0.50 | 0.25 |
| Reaction Conditions: | | | | | |
| Temperature, ° C | 250 | 250 | 300 | 250 | 250 |
| Ethylene Partial Pressure, Psig., Avg | 1,820 | 1,900 | 1,900 | 1,980 | 1,960 |
| Pressure Absorbed During Run, Psig | 860 | 920 | 740 | 800 | 650 |
| Nitrile Product— | | | | | |
| G | 31.1 | 36.0 | 34.4 | 32.6 | 26.2 |
| M.W. | 237 | 202 | 269 | 220 | 245 |

EXAMPLE III

The procedure of Example II is followed except that cumene hydroperoxide is used instead of di-t-butyl peroxide. The following results are obtainable.

| | |
|---|---|
| Acetonitrile charge, ml | 450 |
| Initiator, G | 0.5 |
| Temperature of reaction, °C | 250 |
| Ethylene partial pressure, p.s.i.g | 1900 |
| Nitrile product, G | 21 |

What is claimed is:

1. A method for preparing alkanenitrile products from an alkanenitrile reactant, said alkanenitrile reactant having from 1 to 14 carbon atoms in the alkane portion thereof which consists essentially of reacting said alkanenitrile reactant with a $C_2$–$C_{15}$ monoolefin at a temperature of from about 50°–500° C. and a pressure of from 0–5000 p.s.i.g. in the presence of a free radical forming initiator selected from the group consisting of organic and inorganic per-oxygen compounds whereby alkanenitrile products are formed having a number of carbon atoms equal to at least the sum of the number of carbons in the alkanenitrile reactant and the monoolefin reactant.

2. A method in accordance with claim 1 wherein a chemical initiator selected from the group consisting of organic and inorganic per-oxygen compounds is employed in an amount of from 0.005 to 5 weight percent based on total liquid feed.

3. A method in accordance with claim 1 wherein said monoolefin contains from 6 to 15 carbon atoms.

4. A method in accordance with claim 1 wherein said monoolefin contains from 2 to 5 carbon atoms.

5. A method for preparing an alkanenitrile product from an alkanenitrile reactant having from 1 to 4 carbon atoms in the alkane group thereof, which consists essentially of reacting said alkanenitrile reactant with a $C_2$–$C_{15}$ monoolefin at a temperature of from 50–350° C. for about five minutes to five hours in the presence of from 0.005 to 5 weight percent chemical initiator selected from the group consisting of organic and inorganic per-oxygen compounds and capable of forming a free radical, said weight percent being based on total liquid feed, to produce an alkanenitrile product having a number of carbon atoms equal to at least the sum of carbon atoms in the alkanenitrile reactant and the monoolefin.

6. A method for preparing alkanenitriles which consists essentially of reacting a $C_2$–$C_5$ monoolefin with an alkanenitrile reactant having 1 to 4 carbon atoms in the alkane group thereof at a temperature from about 50–500° C. and a pressure of 0–5000 p.s.i.g. for five minutes to five hours in the presence of a free radical forming initiator selected from the group consisting of organic and inorganic per-oxygen compounds whereby alkanenitrile products having at least 7 carbon atoms in the molecule are formed.

7. A process in accordance with claim 6 wherein said free radical forming initiator is an inorganic peroxide, said temperature is between 50–350° C. and said pressure is between 100–3000 p.s.i.g.

8. A method for growing ethylene monomers onto an alkanenitrile reactant having from 1 to 14 carbon atoms in the alkane portion thereof, which consists essentially of reacting ethylene and said alkanenitrile reactant at a temperature from 50–350° C. and a pressure of from 100–3000 p.s.i.g. in the presence of an organic peroxide free radical initiator whereby at least two monomeric ethylene units are added to the alkanenitrile reactant to form alkanenitrile products having at least 4 more carbon atoms in the molecule than said alkanenitrile reactant.

9. A method in accordance with claim 8 wherein the free radical initiator is di-t-butyl peroxide and is employed in an amount of from 0.005 to 5 weight percent based on total liquid feed.

10. A method in accordance with claim 8 wherein the free radical initiator is added in an amount of from 0.01 to 1 weight percent based on total liquid feed.

References Cited in the file of this patent

UNITED STATES PATENTS

| | | |
|---|---|---|
| 2,757,192 | Jenner | July 31, 1956 |

FOREIGN PATENTS

| | | |
|---|---|---|
| 488,830 | Canada | Dec. 16, 1952 |